United States Patent
Newcomb et al.

(10) Patent No.: US 11,624,730 B2
(45) Date of Patent: Apr. 11, 2023

(54) SYSTEM FOR AUDIBLY DETECTING PRECURSORS OF MATERIAL FRACTURE FOR A SPECIMEN UNDER TEST

(71) Applicant: GM Global Technology Operations LLC, Detroit, MI (US)

(72) Inventors: Bradley Allen Newcomb, Troy, MI (US); Nathan Thompson, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/374,173

(22) Filed: Jul. 13, 2021

(65) Prior Publication Data

US 2023/0014054 A1 Jan. 19, 2023

(51) Int. Cl.
*G01N 29/14* (2006.01)
*G01N 29/06* (2006.01)
*G01N 29/12* (2006.01)

(52) U.S. Cl.
CPC ......... *G01N 29/14* (2013.01); *G01N 29/0654* (2013.01); *G01N 29/12* (2013.01); *G01N 2291/0289* (2013.01)

(58) Field of Classification Search
CPC .... G01N 29/14; G01N 29/0654; G01N 29/12; G01N 2291/0289
See application file for complete search history.

(56) References Cited

U.S. PATENT DOCUMENTS

| | | | | |
|---|---|---|---|---|
| 4,534,219 | A | * | 8/1985 | Nadeau ............... G01N 29/045 73/587 |
| 6,604,013 | B1 | * | 8/2003 | Hamidieh ........... G05B 19/4065 700/174 |
| 2005/0204818 | A1 | * | 9/2005 | Singhal ............... G01N 29/11 73/579 |

FOREIGN PATENT DOCUMENTS

WO WO-2007136111 A1 * 11/2007 ............. G01N 29/14

* cited by examiner

*Primary Examiner* — Natalie Huls
*Assistant Examiner* — Cynthia L Davis
(74) *Attorney, Agent, or Firm* — Vivacqua Crane, PLLC

(57) ABSTRACT

A system for determining a trigger amplitude indicating a precursor to a material fracture in a specimen under test includes a microphone converting acoustic emission emitted by the specimen under test into electrical signals. A load is exerted upon the specimen under test and the acoustic emission are emitted when the load causes the specimen under test to undergo deformation prior to the material fracture. A control module is in electrical communication with the microphone and executes instructions to monitor the electrical signals generated by the microphone and filter the electrical signals generated by the microphone. The control module converts the electrical signals generated by the microphone into individual frequency components based on a fast Fourier Transform (FFT). The individual frequency components each include a peak intensity. The control module determines the trigger amplitude based on the peak intensity of the individual frequency components of the FFT.

16 Claims, 5 Drawing Sheets

US 11,624,730 B2

SYSTEM FOR AUDIBLY DETECTING PRECURSORS OF MATERIAL FRACTURE FOR A SPECIMEN UNDER TEST

INTRODUCTION

The present disclosure relates to a system and method for determining a trigger amplitude indicating precursors of material fracture in a specimen under test based on audible sound. The present disclosure also relates to a system for capturing images of the specimen under test by a camera, where the system instructs the camera to capture images at a different frame rate in response to determining the trigger amplitude has occurred.

Image processing systems are becoming increasingly popular. However, image processing involves storing and processing relatively large amounts of data, which in turn may require significant processing and memory resources. One factor that influences the amount of memory required to store large image files is the frame rate of the camera collecting the images. The frame rate is expressed as frames per second (fps) and represents the number of frames or images that the camera takes per second. Increasing the frame rate results in a larger image file that requires more memory, while decreasing the frame rate results in a smaller image file that requires less memory.

Thus, while image processing systems achieve their intended purpose, there is a need in the art for an approach to decrease the memory requirements of an image processing system.

SUMMARY

According to several aspects, a system for determining a trigger amplitude indicating a precursor to a material fracture in a specimen under test is disclosed. The system includes a microphone converting acoustic emission emitted by the specimen under test into electrical signals. A load is exerted upon the specimen under test and the acoustic emission are emitted when the load causes the specimen under test to undergo deformation prior to the material fracture. The system also includes a control module in electrical communication with the microphone, where the control module executes instructions to monitor the electrical signals generated by the microphone. The control module executes instructions to filter the electrical signals generated by the microphone to allow frequencies within a range of interest and attenuate frequencies outside the range of interest. The control module converts the electrical signals generated by the microphone into individual frequency components based on a fast Fourier Transform (FFT), where the individual frequency components each include a peak intensity that represents audible sound. The control module determines the trigger amplitude based on the peak intensity of the individual frequency components of the FFT.

In one aspect, the individual frequency components of the FFT define an amplitude trace.

In another aspect, the control module determines the trigger amplitude by analyzing the amplitude trace using a kernel density estimation (KDE) function, where the KDE function creates a smoothened estimate of the amplitude trace, and where the smoothened estimate of the amplitude trace includes a plurality of peaks that each represent a number of times that a peak amplitude occurs in the FFT.

In another aspect, the control module determines the trigger amplitude by identifying a tallest peak of the smoothened estimate of the amplitude trace, where the tallest peak represents the peak amplitude occurring most frequently in the FFT.

In yet another aspect, the tallest peak represents audible sound created by background noise.

In still another aspect, the control module determines the trigger amplitude by identifying a second tallest peak of the smoothened estimate of the amplitude trace, where the second tallest peak represents the peak amplitude occurring most frequently in the FFT after the tallest peak.

In one aspect, the second tallest peak represents the acoustic emission emitted by the specimen under test when undergoing deformation prior to the material fracture.

In another aspect, the control module determines the trigger amplitude by determining a valley between the tallest peak and the second tallest peak and selecting an amplitude value corresponding to the valley as the trigger amplitude.

In yet another aspect, the frequencies outside the range of interest represent background noise.

In one aspect, a method for determining a trigger amplitude indicating a precursor to a material fracture in a specimen under test is disclosed. The method includes converting, by a microphone, acoustic emission emitted by the specimen under test into electrical signals. A load is exerted upon the specimen under test and the acoustic emission are emitted when the load causes the specimen under test to undergo deformation prior to the material fracture. The method includes monitoring, by a control module, electrical signals generated by a microphone. The method also includes filtering the electrical signals generated by the microphone to allow frequencies within a range of interest and attenuate frequencies outside the range of interest. The method also includes converting the electrical signals generated by the microphone into individual frequency components based on a fast Fourier Transform (FFT), where the individual frequency components each include a peak intensity that represents audible sound. Finally, the method includes determining the trigger amplitude based on the peak intensity of the individual frequency components of the FFT.

In one aspect, the individual frequency components of the FFT define an amplitude trace, and the method further comprises analyzing the amplitude trace using a KDE function. The KDE function creates a smoothened estimate of the amplitude trace, and the smoothened estimate of the amplitude trace includes a plurality of peaks that each represent a number of times that a peak amplitude occurs in the FFT.

In another aspect, the method further comprises identifying a tallest peak of the smoothened estimate of the amplitude trace, where the tallest peak represents the peak amplitude occurring most frequently in the FFT.

In yet another aspect, the method further comprises identifying a second tallest peak of the smoothened estimate of the amplitude trace, wherein the second tallest peak represents the peak amplitude occurring most frequently in the FFT after the tallest peak.

In still another aspect, the method further comprises determining a valley between the tallest peak and the second tallest peak.

In one aspect, the method further comprises selecting an amplitude value corresponding to the valley as the trigger amplitude.

In another aspect, the frequencies outside the range of interest represent background noise.

In one aspect, a system for capturing images is disclosed. The system includes a specimen under test, wherein a load is exerted upon the specimen under test that causes the specimen under test to undergo deformation prior to a material fracture. The system also includes a camera that captures the images of the specimen under test, where the camera captures the images at a first frame rate and a second frame rate, and the first frame rate is less than the second frame rate. Th system also includes a microphone that converts acoustic emission emitted by the specimen under test into electrical signals, where a load is exerted upon the specimen under test and the acoustic emission are emitted when the load causes the specimen under test to undergo deformation prior to the material fracture. Finally, the system includes a control module in electrical communication with the microphone and the camera. The control module executes instructions to monitor the camera capturing the images at the first frame rate. The control module executes instructions to monitor the electrical signals generated by the microphone for a trigger amplitude, where the electrical signals generated by the microphone indicate sound amplitude. The control module executes instructions to determine the electrical signals generated by the microphone indicate the trigger amplitude has occurred. In response to determining the trigger amplitude has occurred, the control module instructs the camera to capture images of the specimen under test at the second frame rate, where the trigger amplitude indicates a precursor to the material fracture in a specimen under test.

In one aspect, the specimen under test undergoes one of the following tests: an open hole tensile test, an ultimate tensile strength test, a notched tensile test, compression testing, and torsion testing.

In another aspect, the specimen under test is constructed of at least one of the following: a glass fiber composite, a carbon fiber composite, a basalt fiber composite, a plastic, a filled plastic, and a fiber reinforced polymer.

In yet another aspect, the first frame rate is about five frames per second (fps) and the second frame rate is about fifty fps.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
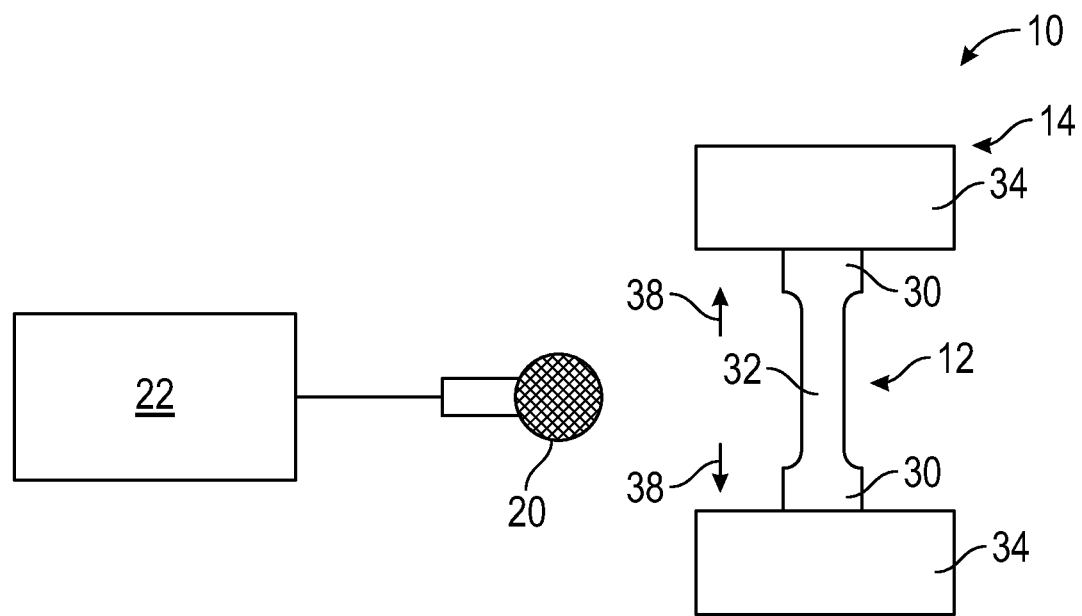
FIG. 1 is a schematic diagram illustrating a system for determining a precursor to a material fracture in a specimen under test, where the system includes a control module in electronic communication with a microphone, according to an exemplary embodiment.

Referring to FIG. 1, an exemplary system 10 for determining a precursor to a material fracture in a specimen under test 12 is illustrated. In the non-limiting embodiment as shown, the system 10 includes the specimen under test 12, a fixture 14 securing the specimen under test 12, a microphone 20, and a control module 22. In the example as shown, the specimen under test 12 is a tensile test specimen including two enlarged ends 30 and a gage section 32 located between the two enlarged ends 30, however, the specimen under test 12 may include other configurations as well. In an embodiment, the specimen under test 12 is constructed of at least one of a glass fiber composite, a carbon fiber composite, a basalt fiber composite, a plastic, a filled plastic, or any other fiber reinforced polymer such as carbon-fiber-reinforced polymers (CFRP), however, it is to be appreciated that other types of materials may be used as well.

FIG. 1 illustrates the fixture 14 including two grips 34 that clamp and secure the enlarged ends 30 of the specimen under test 12, however, it is to be appreciated that FIG. 1 is merely exemplary in nature and other types of fixtures may be used as well. The fixture 14 exerts a load 38 upon the specimen under test 12. For example, FIG. 1 illustrates the load 38 as a tensile force that pulls the specimen under test 12 apart. In one embodiment, the specimen under test 12 undergoes an open hole tensile test, an ultimate tensile strength test, a notched tensile test, compression testing, or torsion testing, however, it is to be appreciated that other types of tests where the specimen under test 12 under undergoes a material fracture may be used as well. It is to be appreciated that in some embodiments, the specimen under test 12 may undergo a material fracture that is non-visual.

Acoustic emission is emitted by the specimen under test 12 prior to material fracture. Specifically, the acoustic emission is emitted when the load 38 causes the specimen under test 12 to undergo deformation prior to the specimen under test 12 fracturing under the load 38. The microphone 20 converts the acoustic emission emitted by the specimen under test 12 into electrical signals 40 (seen in FIG. 2). The electrical signals 40 generated by the microphone 20 indicate sound amplitude. The control module 22 is in electronic communication with the microphone 20 and monitors the electrical signals 40 generated by the microphone 20. As explained below, the control module 22 determines a trigger amplitude of the electrical signals 40 indicating the specimen under test 12 is about to fracture, which is caused by the load 38 exerted by the fixture 14. In other words, the trigger amplitude indicates a precursor to material fracture in the specimen under test 12.

Figure 2:
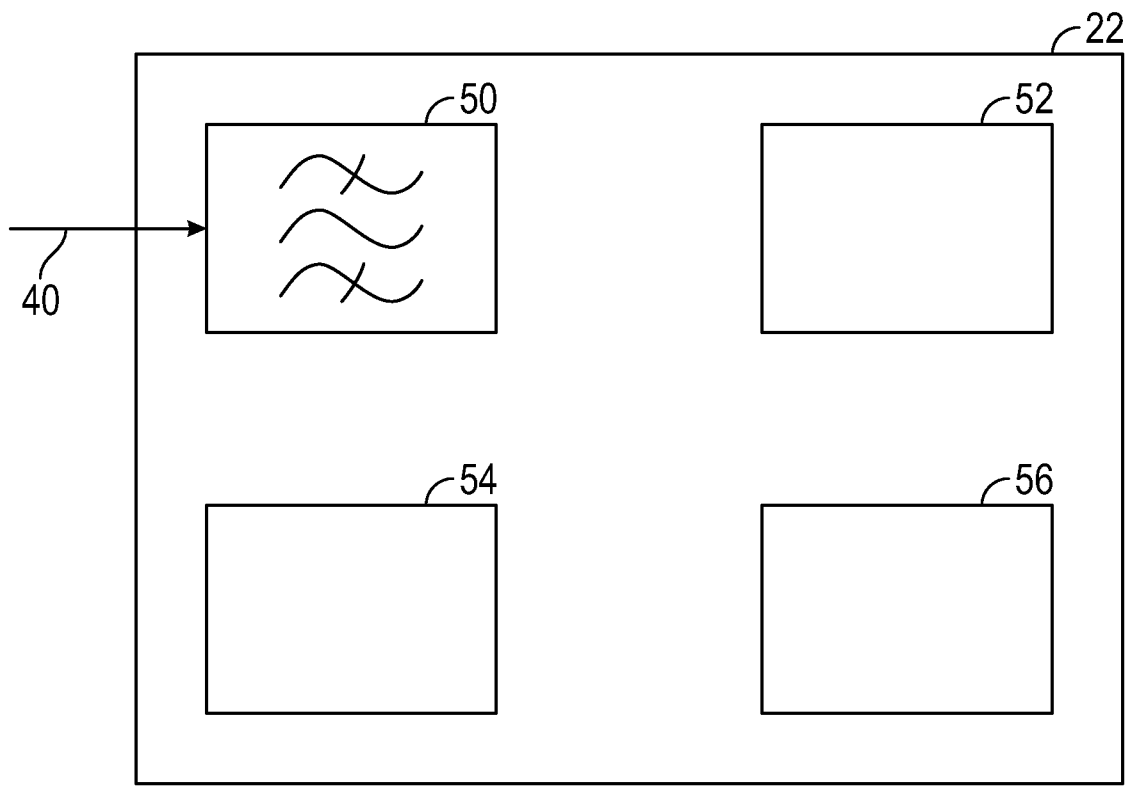
FIG. 2 is a block diagram illustrating the control module shown in FIG. 1 according to an exemplary embodiment.

FIG. 2 is a block diagram illustrating the control module 22, where the control module 22 includes a bandpass filter 50, a fast Fourier Transform (FFT) module 52, a kernel density estimation (KDE) function module 54, and an analyzer module 56. The control module 22 may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the control module 22 may be microprocessorbased such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

Referring to both FIGS. 1 and 2, the bandpass filter 50 of the control module 22 may be implemented using analog components such as resistors, inductors, and capacitors or, alliteratively, as a digital filter. The bandpass filter 50 of the control module 22 filters the electrical signals 40 generated by the microphone 20 (seen in FIG. 1). Specifically, the bandpass filter 50 allows frequencies within a range of interest while attenuating frequencies outside the range of interest. The frequencies within the range of interest include the acoustic emission emitted by the specimen under test 12 as well as the sound emitted by the specimen under test 12 during material fracture. The frequencies outside the range of interest represent background noise that may be detected by the microphone 20. It is to be appreciated that the specific values of the frequencies within the range of interest depend upon variables such as, for example, the material of the specimen under test 12 and the specific type of test that the specimen under test 12 undergoes.

Figure 3:
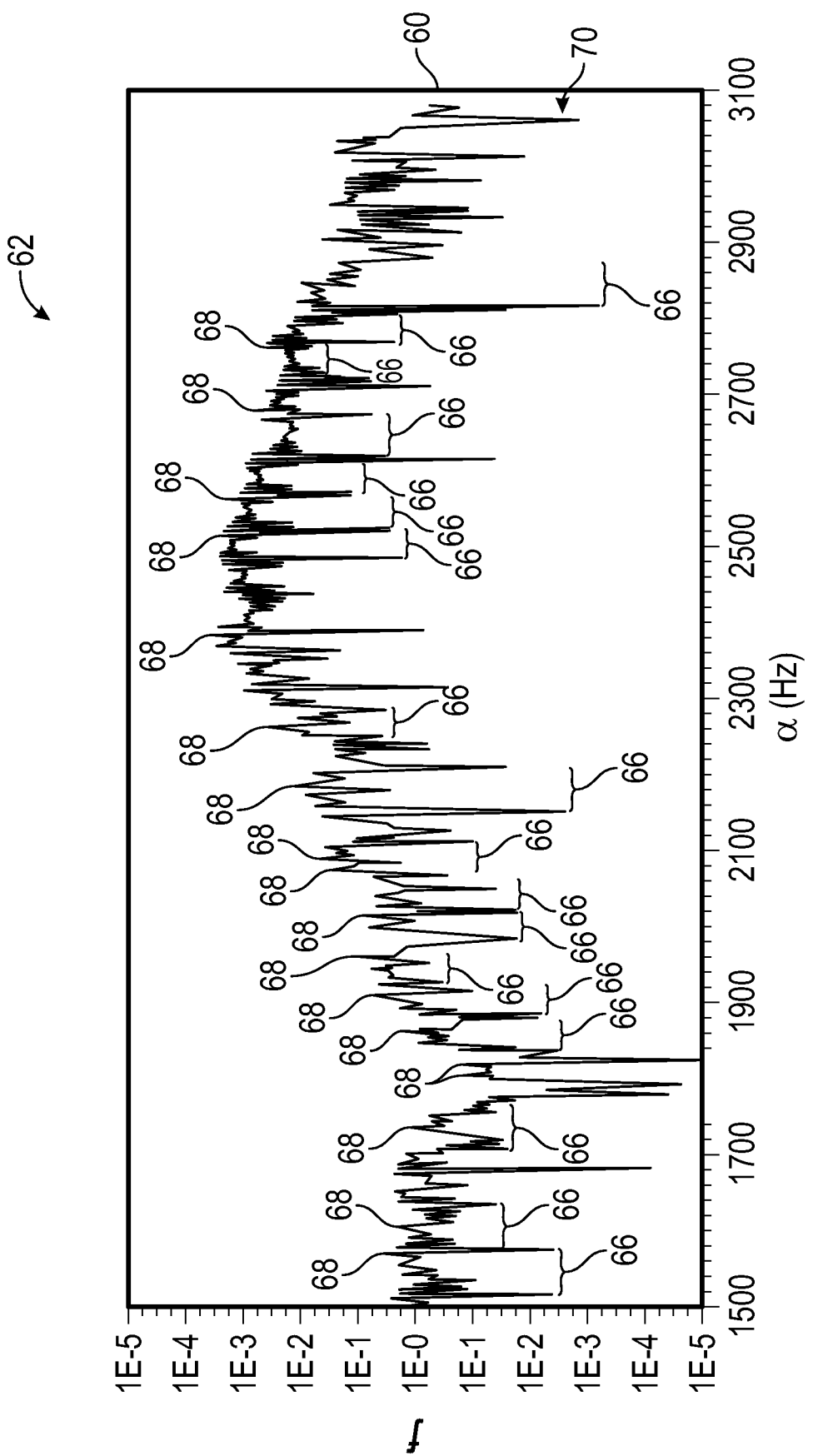
FIG. 3 illustrates a graph of an exemplary fast Fourier transform (FFT) of the electrical signal received from the microphone shown in FIG. 1 according to an exemplary embodiment.

FIG. 3 is a graph 60 illustrating an exemplary FFT 62 of the electrical signals 40 received from the bandpass filter 50. The graph 60 includes an x-axis representing frequency in Hertz and a y-axis representing sound amplitude. Referring to both FIGS. 2 and 3, the FFT module 52 of the control module 22 converts the electrical signals 40 from the bandpass filter 50 into individual frequency components 66. As seen in FIG. 3, the individual frequency components 66 each include a peak amplitude 68 that represents audible sound. The individual frequency components 66 of the FFT 62 define an amplitude trace 70. As explained below, the trigger amplitude is determined based on the peak amplitude 68 of the individual frequency components 66 of the FFT 62.

Figure 4:
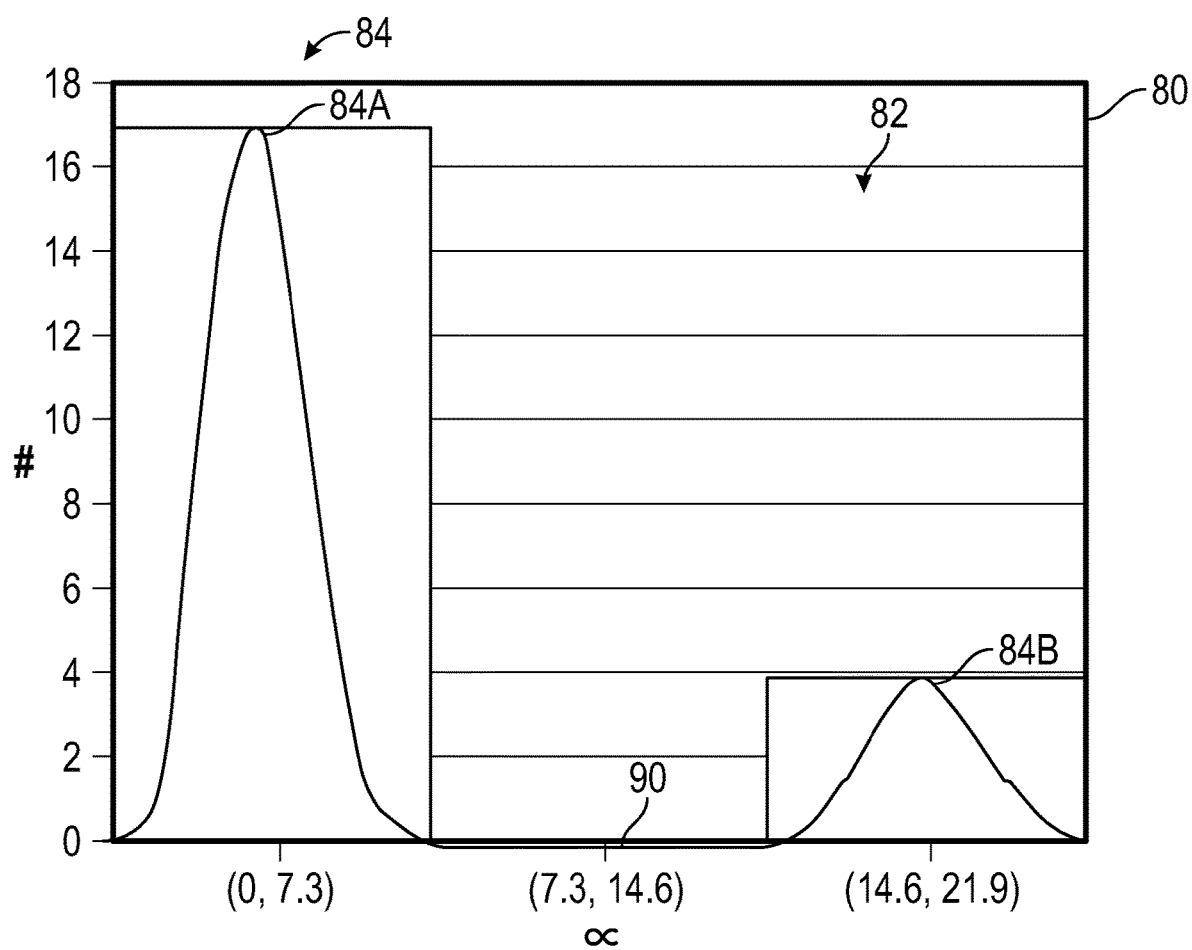
FIG. 4 illustrates a graph illustrating a smoothened estimate of the FFT shown in FIG. 3 determined using a kernel density estimation (KDE) function according to an exemplary embodiment.

The KDE function module 54 of the control module 22 analyzes the amplitude trace 70 of the FFT 62 using a KDE function. FIG. 4 is a graph 80 illustrating a smoothened estimate of the amplitude trace 82 of the FFT 62 (FIG. 3). The graph 80 includes an x-axis representing sound amplitude and a y-axis representing a number of samples. Referring now to FIGS. 2, 3, and 4, the KDE function module 54 executes a KDE function that creates the smoothened estimate of the amplitude trace 82 of the FFT 62 (FIG. 3). The smoothened estimate of the amplitude trace 82 includes a plurality of peaks 84. Each peak 84 of the smoothened estimate of the amplitude trace 82 represents a number of times that the peak amplitude 68 occurs in the FFT 62 (FIG. 3).

The analyzer module 56 of the control module 22 determines the trigger amplitude based on the smoothened estimate of the amplitude trace 82. Specifically, the analyzer module 56 identifies a tallest peak 84A of the smoothened estimate of the amplitude trace 82. The tallest peak 84A represents the peak amplitude 68 that occurs most frequently in the FFT 62 (FIG. 3). It is to be appreciated that the tallest peak 84A of the smoothened estimate of the amplitude trace 82 shown in FIG. 4 represents audible sound created by background noise. The analyzer module 56 identifies a second tallest peak 84B of the smoothened estimate of the amplitude trace 82. The second tallest peak 84B represents the peak amplitude 68 occurring most frequently in the FFT 62 after the tallest peak amplitude 68A. The second tallest peak 84B represents the acoustic emission emitted by the specimen under test 12 (FIG. 1) when undergoing deformation prior to the material fracture.

As seen in FIG. 4, the tallest peak 84A and the second tallest peak 84B are separated into two distinct groups, and a valley 90 is located between the two peaks 84A, 84B. The analyzer module 56 of the control module 22 determines the trigger amplitude by first identifying the valley 90 between the tallest peak 84A and the second tallest peak 84B, and then selecting an amplitude value corresponding to the valley 90 as the trigger amplitude. If there is no clear separation between the two peaks 84A, 84B, then it is to be appreciated that the acoustic emission has not been emitted yet.

Figure 5:
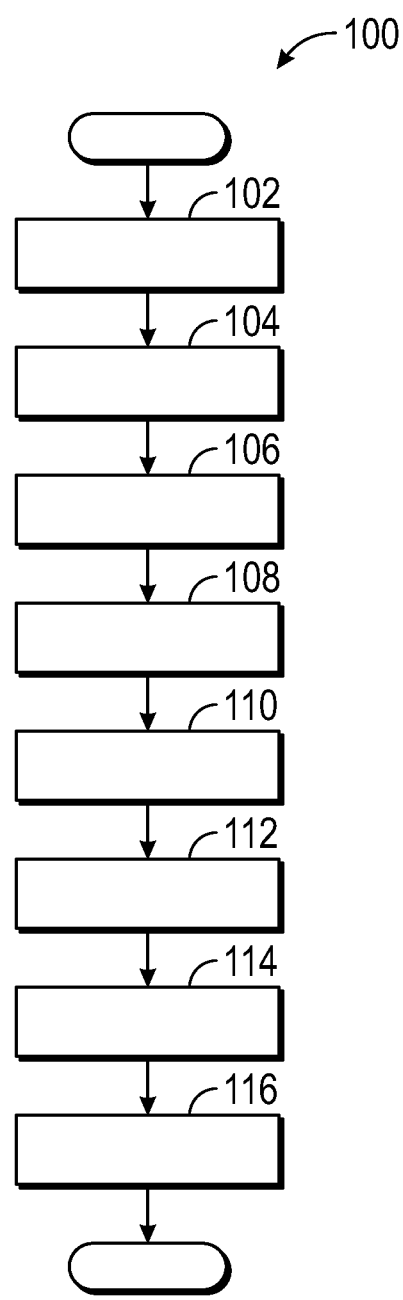
FIG. 5 is a process flow diagram illustrating a method for determining the trigger amplitude using the system as shown in FIG. 1 according to an exemplary embodiment.

FIG. 5 is a process flow diagram illustrating an exemplary method 100 for determining the trigger amplitude using the system 10 shown in FIG. 1. Referring now to FIGS. 1-5, the method 100 begins at block 102. In block 102, the control module 22 (FIG. 2) monitors the electrical signals 40 generated by the microphone 20. The method 100 may then proceed to block 104.

In block 104, the bandpass filter 50 of the control module 22 (FIG. 2) filters the electrical signals 40 generated by the microphone 20. The method 100 may then proceed to block 106.

In block 106, the FFT module 52 of the control module 22 converts the electrical signals 40 from the bandpass filter 50 into individual frequency components 66 (seen in FIG. 3). The method 100 may then proceed to block 108.

In block 108, the KDE function module 54 of the control module 22 analyzes the amplitude trace 70 of the FFT 62 (FIG. 3) using the KDE function. The method 100 then proceeds to block 110.

In block 110, the analyzer module 56 of the control module 22 identifies the tallest peak 84A of the smoothened estimate of the amplitude trace 82 (seen in FIG. 4). The method 100 then proceeds to block 112.

In block 112, the analyzer module 56 of the control module 22 identifies the second tallest peak 84B of the smoothened estimate of the amplitude trace 82. The method 100 may then proceed to block 114.

In block 114, the analyzer module 56 of the control module 22 determines the trigger amplitude by identifying the valley 90 between the tallest peak 84A and the second tallest peak 84B. The method 100 may then proceed to block 116.

In block 116, the analyzer module 56 of the control module 22 selects an amplitude value corresponding to the valley 90 as the trigger amplitude. The method 100 may then terminate.

Figure 6:
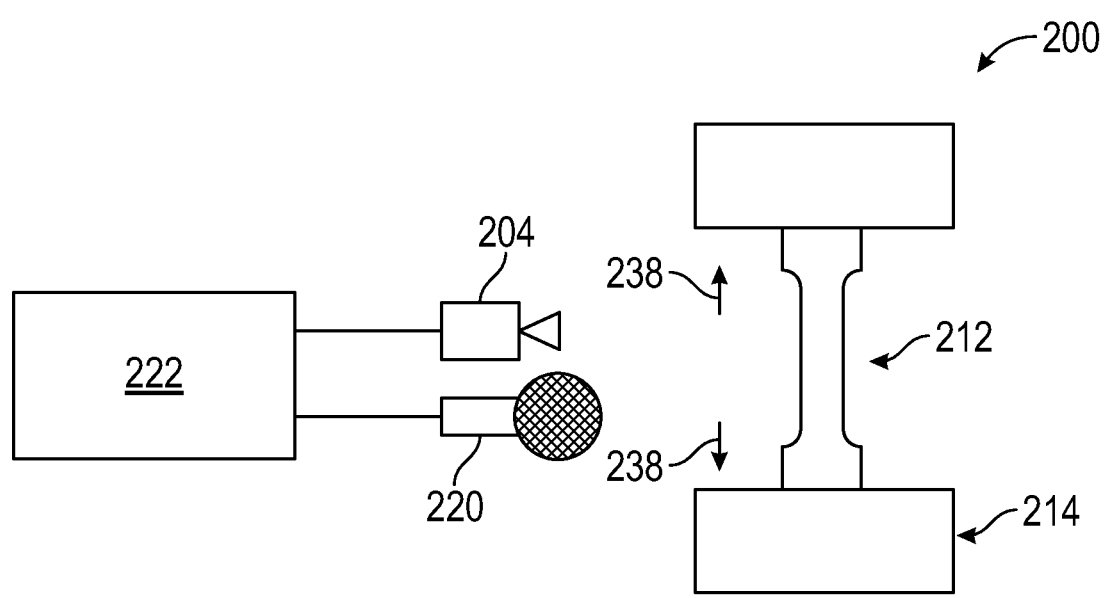
FIG. 6 is a schematic diagram of a system for capturing images of the specimen under test by a camera according to an exemplary embodiment.

FIG. 6 illustrates a system 200 for capturing images of a specimen under test 212 by a camera 204. In an embodiment, the camera 204 may be a stereo camera configured to capture three-dimensional images of the specimen under test 212, however, two-dimensional images may also be used as well. As explained below, the system 200 instructs the camera 204 to capture images at a faster frame rate in response to determining the trigger amplitude has occurred. Thus, the trigger amplitude determined by the system 10 (FIG. 1) may be used to initiate a hardware triggering event that initiates an external action (i.e., the change in frame rate of the camera 204). Although FIG. 6 illustrates the system 200 using the trigger amplitude to initiate a change in frame rate of the camera 204, it is to be appreciated that the trigger amplitude may be used to initiate other events as well.

In the embodiment as shown in FIG. 6, the system 200 includes the camera 204, a specimen under test 212, a microphone 220, and a control module 222. The control module 222 is in electronic communication with both the camera 204 and the microphone 220. Similar to the embodiment as shown in FIG. 1, a load 238 is exerted upon the specimen under test 212 by a fixture 214, where the load 238 causes the specimen under test 212 to undergo deformation prior to a material fracture.

The camera 204 captures images of the specimen under test 212. Specifically, the camera 204 captures the images at a first frame rate and a second frame rate, where the first frame rate is less than the second frame rate. It is to be appreciated that the camera 204 captures images at the first frame rate prior to the system 200 determining the trigger amplitude has occurred. Since the images captured by the camera 204 are not of significant interest, the first frame rate may be significantly slower than the second frame rate. Once the control module 222 determines the trigger amplitude has occurred, the control module 222 instructs the camera 204 to capture images at the second frame rate. The second frame rate is greater than the second frame because the images captured immediately after the specimen under test 212 emits the acoustic emission are of the greatest interest. Collecting images at a faster frame rate once the acoustic emission occurs results in a reduction of images that are collected, processed, and stored by the control module 222.

Continuing to refer to FIG. 6, the control module 222 monitors the camera 204 capturing images at the first frame rate. The control module 222 also monitors the electrical signals 40 (seen in FIG. 2) generated by the microphone 220 for the trigger amplitude. During testing, the control module 222 determines the electrical signals 40 generated by the microphone 220 indicate the trigger amplitude has occurred. In response to determining the trigger amplitude has occurred, the control module 222 instructs the camera 204 to capture images of the specimen under test 212 at the second frame rate.

In one non-limiting example, the first frame rate is about five frames per second (fps) and the second frame rate is about fifty fps. In this example, the entire length of time that the camera captures images is about fifty four seconds, and the camera 204 is instructed to switch to the second frame rate after about fifty seconds into the test, once the trigger amplitude is detected. Therefore, the camera 204 only captures images at the second frame rate during the last four seconds of the test. If the second frame rate was used for the entire length of time, then the control module 222 would collect 2700 images. However, since the camera 204 switches to the second frame rate 50 seconds into the test, only 450 images are collected. Therefore, in the present example, instructing the camera 204 to switch to the second frame rate results in about an eighty-three percent reduction in images that are collected, processed, and stored by the control module 222. Accordingly, the disclosed system 200 provides an approach for reducing the amount of image data that is stored and processed by the control module 222.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining a trigger amplitude indicating a precursor to a material fracture in a specimen under test, the system comprising:
  a microphone converting acoustic emission emitted by the specimen under test into electrical signals, wherein a load is exerted upon the specimen under test and the acoustic emission are emitted when the load causes the specimen under test to undergo deformation prior to the material fracture;
  a control module in electrical communication with the microphone, wherein the control module executes instructions to:
    monitor the electrical signals generated by the microphone;
    filter the electrical signals generated by the microphone to allow frequencies within a range of interest and attenuate frequencies outside the range of interest;
    convert the electrical signals generated by the microphone into individual frequency components based on a fast Fourier Transform (FFT), wherein the individual frequency components each include a peak intensity that represents audible sound;
    determine the trigger amplitude based on the peak intensity of the individual frequency components of the FFT, wherein the individual frequency components of the FFT define an amplitude trace;
    analyze the amplitude trace using a kernel density estimation (KDE) function, wherein the KDE function creates a smoothened estimate of the amplitude trace, and wherein the smoothened estimate of the amplitude trace includes a plurality of peaks that each represent a number of times that a peak amplitude occurs in the FFT; and
    identify a tallest peak of the smoothened estimate of the amplitude trace, wherein the tallest peak represents the peak amplitude occurring most frequently in the FFT.

2. The system of claim 1, wherein the tallest peak represents audible sound created by background noise.

3. The system of claim 1, wherein the control module determines the trigger amplitude by:
  identify a second tallest peak of the smoothened estimate of the amplitude trace, wherein the second tallest peak represents the peak amplitude occurring most frequently in the FFT after the tallest peak.

4. The system of claim 3, wherein the second tallest peak represents the acoustic emission emitted by the specimen under test when undergoing deformation prior to the material fracture.

5. The system of claim 3, wherein the control module determines the trigger amplitude by:
  determine a valley between the tallest peak and the second tallest peak; and
  select an amplitude value corresponding to the valley as the trigger amplitude.

6. The system of claim 1, wherein the frequencies outside the range of interest represent background noise.

7. The system of claim 1, further comprising a camera in electronic communication with the control module, wherein the camera captures images of the specimen under test.

8. The system of claim 7, wherein the camera captures the images at a first frame rate and a second frame rate, wherein the first frame rate is less than the second frame rate.

9. The system of claim 8, wherein the first frame rate is about five frames per second (fps) and the second frame rate is about fifty fps.

10. The system of claim 8, wherein the control module executes instructions to:
monitor the camera capturing the images at the first frame rate; and
in response to determining the trigger amplitude has occurred, instruct the camera to capture images of the specimen under test at the second frame rate.

11. A method for determining a trigger amplitude indicating a precursor to a material fracture in a specimen under test, the method comprising:
converting, by a microphone, acoustic emission emitted by the specimen under test into electrical signals, wherein a load is exerted upon the specimen under test and the acoustic emission are emitted when the load causes the specimen under test to undergo deformation prior to the material fracture;
monitoring, by a control module, electrical signals generated by the microphone;
filtering the electrical signals generated by the microphone to allow frequencies within a range of interest and attenuate frequencies outside the range of interest;
converting the electrical signals generated by the microphone into individual frequency components based on a fast Fourier Transform (FFT), wherein the individual frequency components each include a peak intensity that represents audible sound;
determining the trigger amplitude based on the peak intensity of the individual frequency components of the FFT, wherein the individual frequency components of the FFT define an amplitude trace;
analyzing the amplitude trace using a KDE function, wherein the KDE function creates a smoothened estimate of the amplitude trace, and wherein the smoothened estimate of the amplitude trace includes a plurality of peaks that each represent a number of times that a peak amplitude occurs in the FFT; and
identifying a tallest peak of the smoothened estimate of the amplitude trace, wherein the tallest peak represents the peak amplitude occurring most frequently in the FFT.

12. The method of claim 11, wherein the method further comprises:
identifying a second tallest peak of the smoothened estimate of the amplitude trace, wherein the second tallest peak represents the peak amplitude occurring most frequently in the FFT after the tallest peak.

13. The method of claim 12, wherein the method further comprises:
determining a valley between the tallest peak and the second tallest peak.

14. The method of claim 13, wherein the method further comprises:
selecting an amplitude value corresponding to the valley as the trigger amplitude.

15. The method of claim 11, wherein the frequencies outside the range of interest represent background noise.

16. The method of claim 11, wherein the method further comprises:
monitoring, by the control module, a camera capturing images of the specimen under test at a first frame rate; and
in response to determining the trigger amplitude has occurred, instruct the camera to capture images of the specimen under test at a second frame rate, wherein the first frame rate is less than the second frame rate.

* * * * *